(12) United States Patent
Lin

(10) Patent No.: US 7,444,758 B1
(45) Date of Patent: Nov. 4, 2008

(54) TAPE CAPABLE OF AUTOMATICALLY ARRESTING

(75) Inventor: Ping-Lin Lin, Sanchong (TW)

(73) Assignee: Top-Long Industrial Co., Ltd., Sanchong, Taipei County (TW)

( * ) Notice: Subject to any disclaimer, the term of this patent is extended or adjusted under 35 U.S.C. 154(b) by 1 day.

(21) Appl. No.: 11/790,295

(22) Filed: Apr. 24, 2007

(51) Int. Cl.
 *G01B 3/10* (2006.01)
(52) U.S. Cl. ..................... 33/767; 242/385.4
(58) Field of Classification Search ............ 33/761, 33/767, 768; 242/285, 381, 381.6, 385, 385.4
See application file for complete search history.

(56) References Cited

U.S. PATENT DOCUMENTS 4,856,726 A * 8/1989 Kang ................. 242/384.7
7,065,896 B1 * 6/2006 Lin ........................ 33/767
2008/0034604 A1 * 2/2008 Critelli et al. ............ 33/767
2008/0086904 A1 * 4/2008 Murray .................. 33/767

* cited by examiner

*Primary Examiner*—G. Bradley Bennett
(74) *Attorney, Agent, or Firm*—Troxell Law Office, PLLC

(57) ABSTRACT

A tape capable of automatically arresting is provided which includes a casing, a gauge accommodated in the casing, arresting members, and a button movably mounted on an end of the casing. A notch is defined at an end of the casing. The gauge includes a reel shaft and a scale strip spirally enlacing the reel shaft. Each arresting member includes a rod, an abutting block on an end of the rod and corresponding to a side of the reel shaft, and a resilient portion around the rod. A button includes a pressing portion received in the notch, and a rotating shaft corresponding to the pressing portion. The rotating shaft includes a first arm and a second arm in response to the abutting blocks of the arresting members. In the event the scale strip of the gauge is pulled out, the arresting members automatically limit movement of the scale strip.

3 Claims, 5 Drawing Sheets

TAPE CAPABLE OF AUTOMATICALLY ARRESTING

BACKGROUND OF THE INVENTION (a) Field of the Invention

The present invention relates to a tape capable of automatically arresting, and particularly to a tape capable of automatically arresting which automatically stops movement of a gauge of the tape when the gauge is drawn out at a desired length.

(b) Description of the Prior Art

Referring to FIG. 5, a conventional tape essentially has a casing 5 and a gauge 6 accommodated within the casing 5. The casing 5 forms an opening 51, and the gauge 6 has an end extendable through the opening 51. A pushing button 7 is movably formed on the casing 5 and corresponding to the opening 51. An arresting member 8 engages with the pushing button 7. Gears 71, 81 are respectively provided on the arresting member 8 and the pushing button 7 for meshing with each other.

For utilizing the tape, an end of the gauge 6 is pulled out of the opening 51. The pushing button 7 is pushed downwardly when the gauge 6 reaches a desired length. The gear 71 of the pushing button 7 meshes with the gear 81 of the arresting member 8, and drives the gear 81 to rotate. Thereafter the arresting member 8 biases against the gauge 6, whereby the gauge 6 is held at the desired scale. In order to release the gauge 6, the pushing button 7 is pushed upwardly. The gear 71 of the pushing button 7 meshes with the gear 81 of the arresting member 8, and drives the gear 81 to rotate reversely. The arresting member 8 deviates from the gauge 6, making the gauge 6 return freely.

The arresting member 8 usually biases against the gauge 6 to hold the gauge 6 at a desired scale length. However, the pushing button 7 and the arresting member 8 are both made of plastic material. After a period of use, the gears 71, 81 tend to wear out, and thus the gear 71 of the pushing button 7 is not able to accurately mesh with the gear 81 of the arresting member 8. Correspondingly, the pushing button 7 cannot bring the arresting member 8 to rotate to reach a proper position for pressing the gauge 6. The gauge 6 may draw back anticipatedly in the case of stopping. Moreover, for the purpose of holding the gauge 6 at a desired scale, the pushing button 7 has to move downwardly by a user's finger. It is troublesome when the tape is being employed.

SUMMARY OF THE INVENTION

In view of the above, an objective of the present invention is directed towards a tape capable of automatically arresting which holds a gauge of the tape when a scale strip of the gauge is pulled out, thereby automatically limiting movement of the scale strip.

The tape capable of automatically arresting according to the present invention comprises a casing, a gauge accommodated in the casing, arresting members, and a button. The casing has a central axis through a center thereof. A notch is defined at an end of the casing. A slot is defined nearby the notch. Activating grooves are respectively defined in opposing inner surfaces of the casing and beside the notch. Each activating groove forms a slope therein. The gauge includes a reel shaft mounted on the central axis, and a scale strip spirally enlacing the reel shaft. The scale strip has an end corresponding to the slot of the casing. The arresting members are respectively received in the activating grooves of the casing. Each arresting member includes a rod, an abutting block on an end of the rod and corresponding to a side of the reel shaft, and a resilient portion around the rod. The resilient portion has two ends respectively abutting against the activating grooves and an end of the abutting block. The button is movably mounted on an end of the casing, and includes a pressing portion and a rotating shaft corresponding to the pressing portion. The pressing portion is received in the notch. The rotating shaft includes a first arm in response to the pressing portion, and a second arm in response to the abutting blocks of the arresting members.

DETAILED DESCRIPTION OF THE PREFERRED EMBODIMENTS

Figure 1:
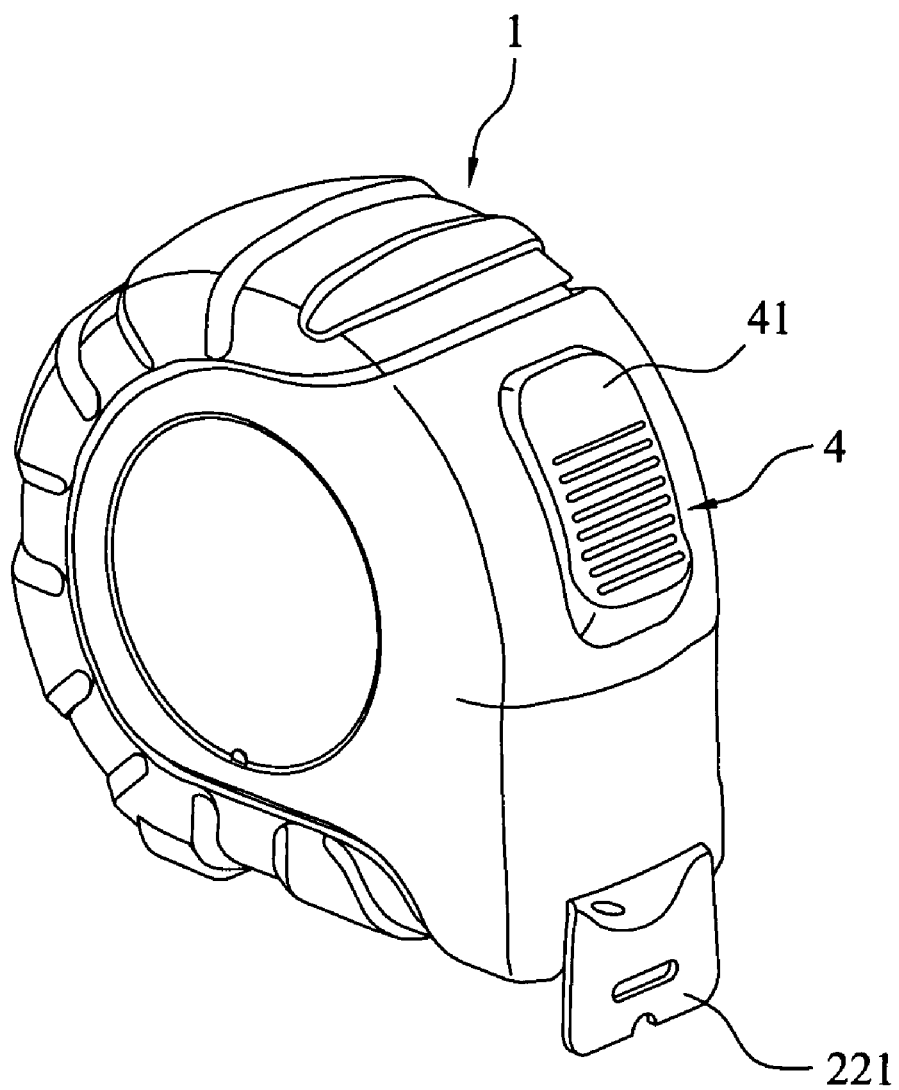
FIG. 1 is a perspective view of a tape according to the present invention.
Figure 2:
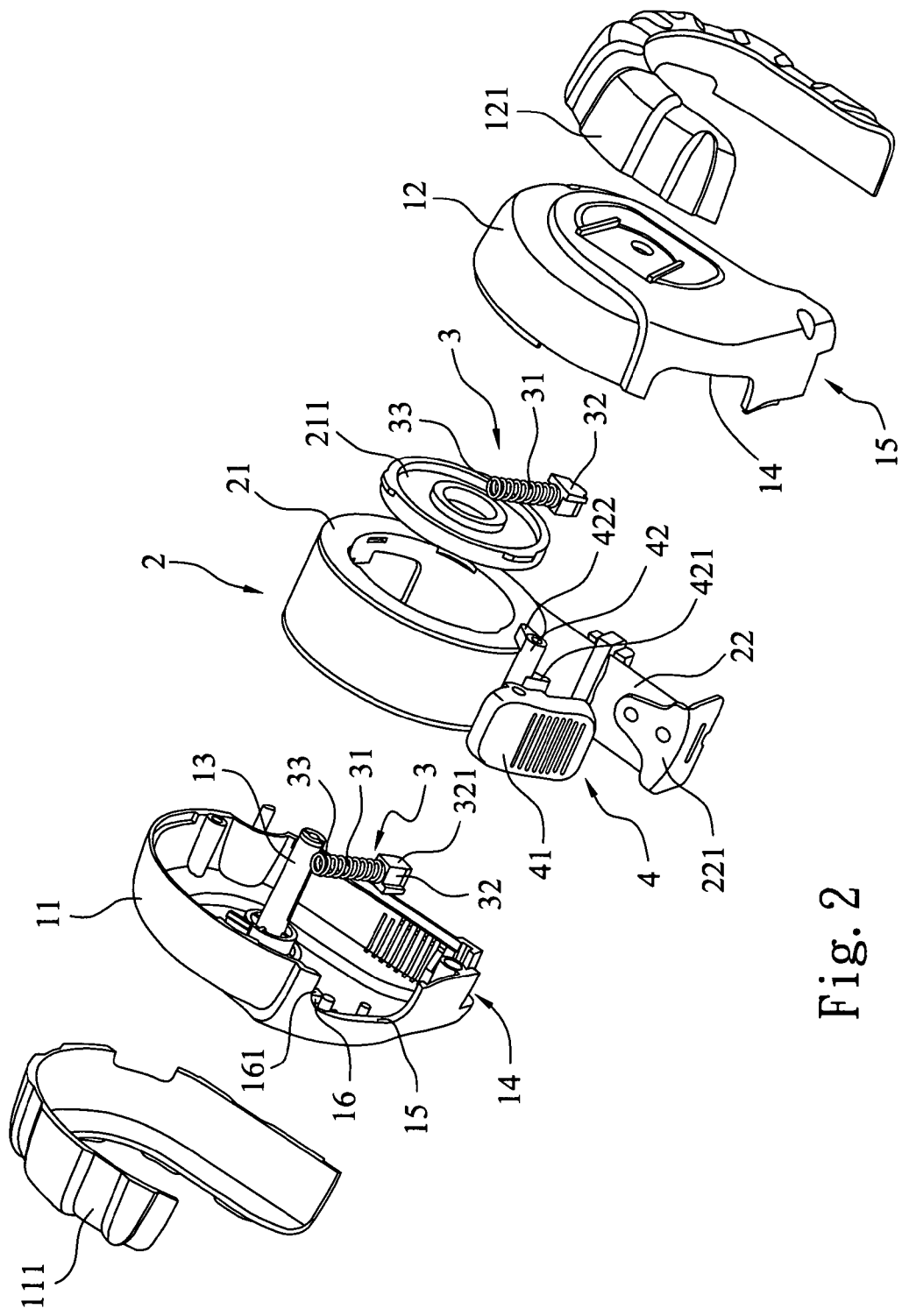
FIG. 2 is an exploded view of the tape of FIG. 1.

With reference to FIGS. 1 and 2, a tape capable of automatically arresting in accordance with the present invention comprises a casing 1, a gauge 2 accommodated in the casing 1, arresting members 3 and a button 4.

The casing 1 comprises a top cover 11 and a bottom cover 12 assembled together. A top envelop layer 111 envelops the top cover 11, and a bottom envelop layer 121 envelops the bottom cover 12. The casing G has a central axis 13 transversely through a center thereof. A notch 14 is defined at an end of the casing 1. A slot 15 is defined nearby the notch 14. Activating grooves 16 are respectively defined in opposing inner surfaces of the casing 1. Each activating groove 16 forms a slope 161 therein.

The gauge 2 includes a reel shaft 21 mounted on the central axis 13, and a scale strip 22 spirally enlacing the reel shaft 21. The reel shaft 21 has a gasket 211 in a center thereof. The scale strip 22 forms an anchor 221 on an end thereof and extendable outward beyond the slot 15 of the casing 1.

The arresting members 3 are respectively received in the activating grooves 16 of the casing 1. Each arresting member 3 includes a rod 31, an abutting block 32 on an end of the rod 31 and corresponding to a side of the reel shaft 21, and a resilient portion 33 around the rod 31. The resilient portion 33 has two ends respectively abutting against the activating grooves 16 and an end of the abutting block 32. The abutting block 32 forms an interferential portion 321 on a surface thereof for corresponding to the reel shaft 21.

The button 4 is movably mounted on an end of the casing 1, and includes a pressing portion 41 and a rotating shaft 42 corresponding to the pressing portion 41. The pressing portion 41 is received in the notch 14. The rotating shaft 41 includes a first arm 421 and a second arm 422. The first arm 421 corresponds to the pressing portion 41, and the second arm 422 corresponds to the abutting blocks 32 of the arresting members 3.

Figure 3:
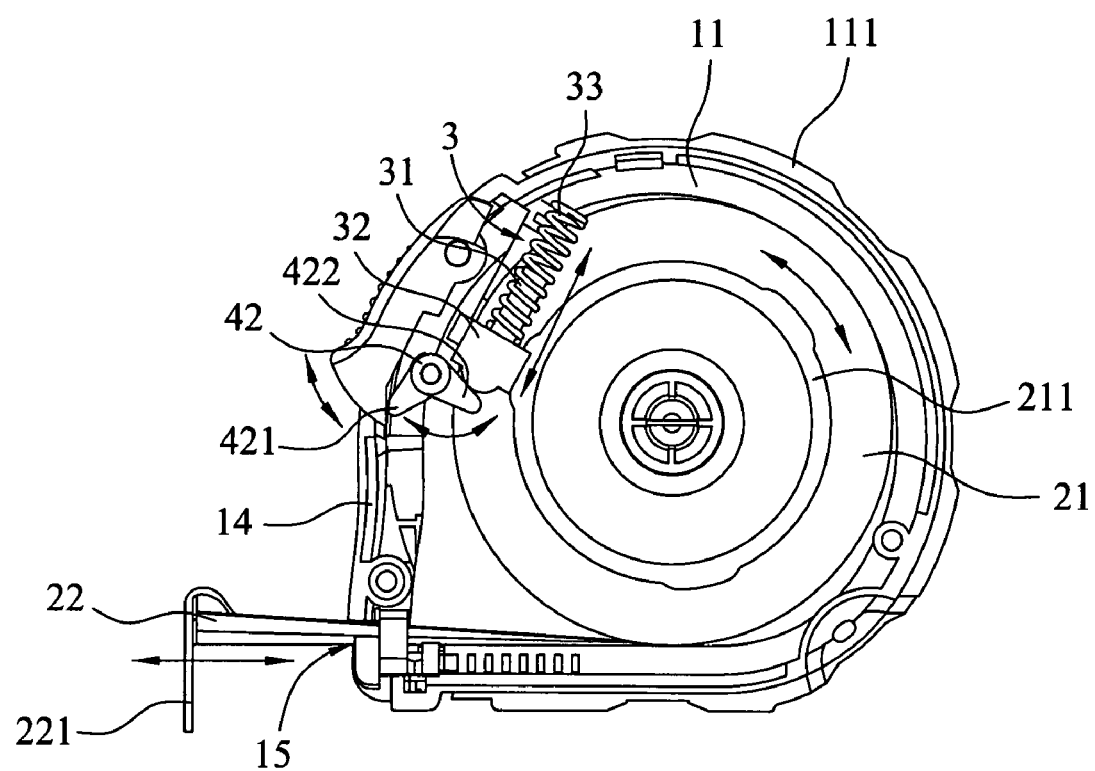
FIG. 3 is a cross-sectional view when the tape is being used.
Figure 4:
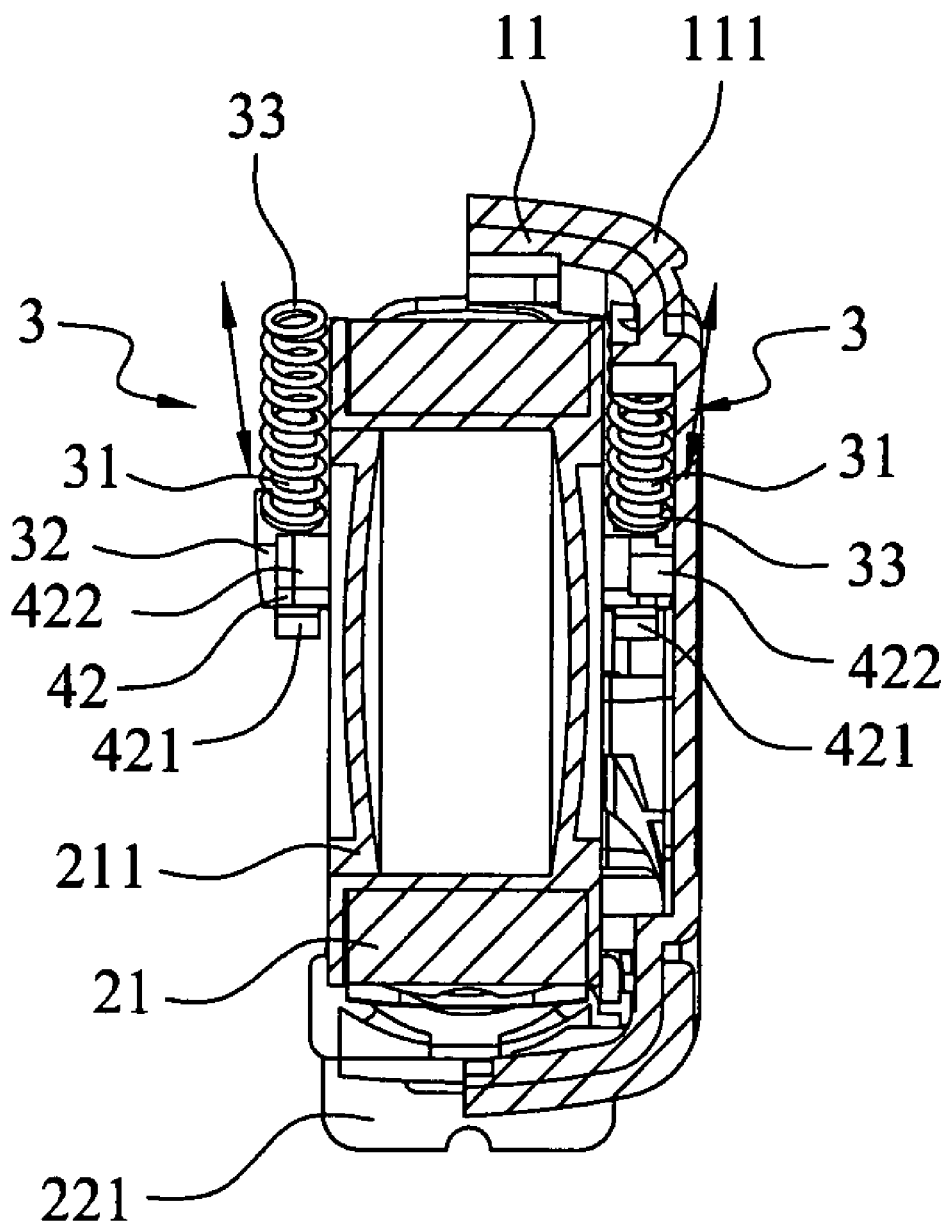
FIG. 4 is another cross-sectional view when the tape is being used.
Figure 5:
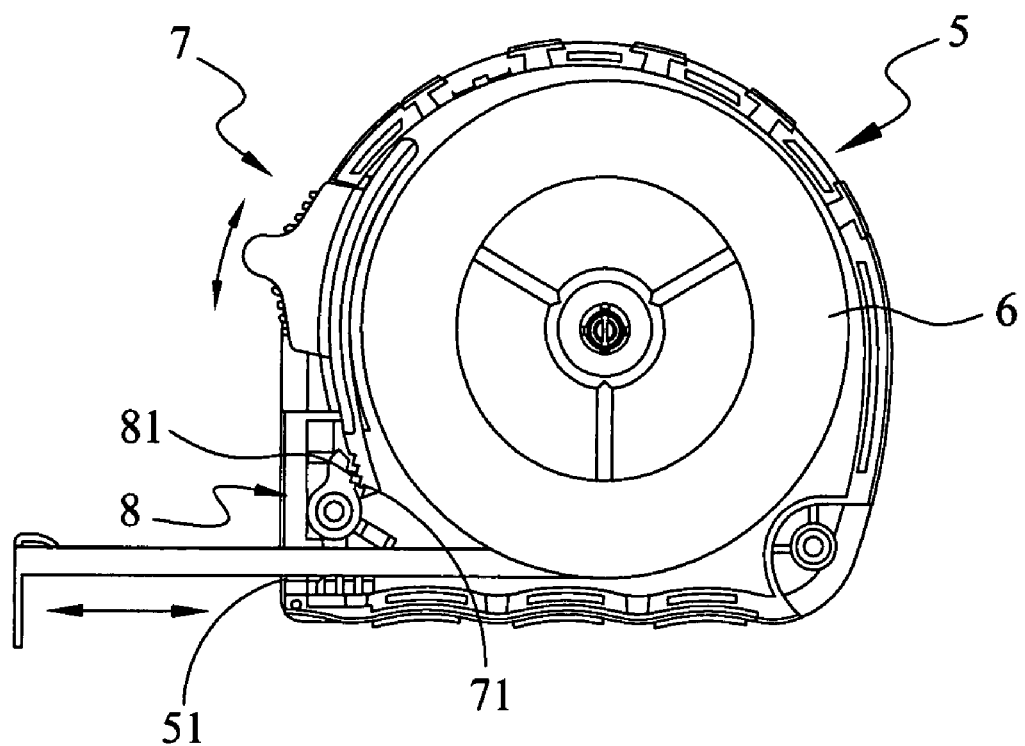
FIG. 5 is a perspective view of a conventional tape.

Referring to FIGS. 3 and 4, in use, the anchor 221 that is exposed beyond the slot 15 of the casing 1 is drawn out. Correspondingly, the scale strip 22 is pulled out. The reel shaft 21 is brought to rotate, and drives the abutting blocks 32 of the arresting members 3 to move along the slopes 161 of the activating grooves 16. The resilient portions 33 are forced to shrink, thereby allowing the scale strip 22 to be drawn out freely.

When the scale strip 22 is pulled out to a predetermined position, the reel shaft 21 rotates reversely. Rewinding force of the reel shaft 21 and returning force of the resilient portions 33 drive the abutting blocks 32 to move upwardly along the slopes 161 of the activating grooves 16. The abutting blocks 32 respectively bias against the opposite sides of the reel shaft 21. Larger rewinding force the reel shaft 21 produces, larger pressing force the abutting blocks 32 generate to bias against the reel shaft 21. In this manner, the reel shaft 21 is stopped, and a desired length of the scale strip 22 is retained to be exposed out of the slot 15 of the casing 1.

In order to draw back the scale strip 22, the pressing portion 41 of the button 4 is pressed. The first arm 421 of the rotating shaft 42 rotates downwardly, while the second arm 422 of the rotating shaft 42 simultaneously pushes the abutting blocks 32 of the arresting members 3 to move backwardly. The resilient portions 33 are forced to deform and shrink. The abutting blocks 32 let out along the slopes 161 of the activating grooves 16. When the abutting blocks 32 completely disengage from the opposite sides of the reel shaft 21, the reel shaft 21 rotates freely to rewind the scale strip 22 without restraint by the abutting blocks 32.

During the scale strip 22 winds on, when the pressing portion 41 of the button 4 is released, rewinding force of the reel shaft 21 and returning force of the resilient portions 33 push the abutting blocks 32 to move upwardly along the slopes 161 of the activating grooves 16. The abutting blocks 32 respectively abut against the opposite sides of the reel shaft 21 to arrest the gauge 2.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A tape capable of automatically arresting, comprising:
    a casing forming a central axis, and defining a notch at an end thereof and a slot nearby the notch, activating grooves being respectively defined in opposing inner surfaces of the casing, each activating groove forming a slope therein;
    a gauge accommodated in the casing, and including a reel shaft mounted on the central axis, and a scale strip enlacing the reel shaft, the scale strip having an end corresponding to the slot of the casing; arresting members respectively received in the activating grooves of the casing, each arresting member including a rod, an abutting block on an end of the rod and corresponding to a side of the reel shaft, and a resilient portion around the rod, the resilient portion having two ends respectively abutting against the activating grooves and an end of the abutting block; and
    a button movably mounted on an end of the casing, and including a pressing portion received in the notch, and a rotating shaft corresponding to the pressing portion, the rotating shaft including a first arm in response to the pressing portion, and a second arm in response to the abutting blocks of the arresting members.

2. The tape capable of automatically arresting as claimed in claim 1, wherein the casing comprises a top cover and a bottom cover assembled together, a top envelop layer enveloping the top cover, and a bottom envelop layer enveloping the bottom cover.

3. The tape capable of automatically arresting as claimed in claim 1, wherein the abutting block of each arresting member forms an interferential portion on a surface thereof for corresponding to the reel shaft.

\* \* \* \* \*